Patented May 11, 1943

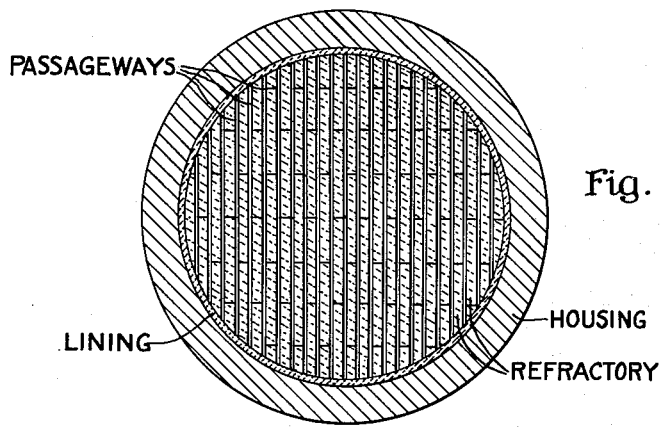
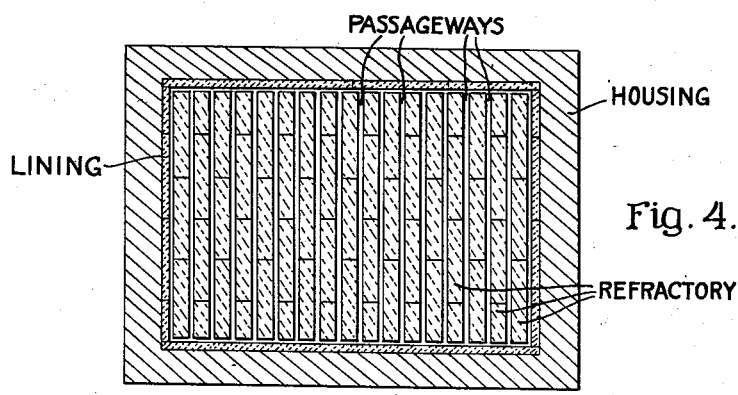
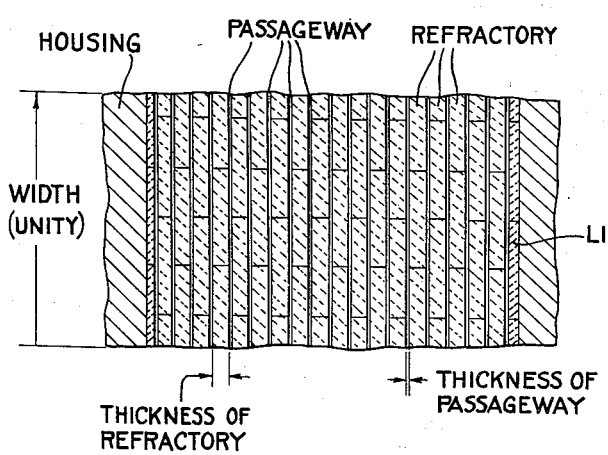

2,318,688

UNITED STATES PATENT OFFICE 2,318,688

REGENERATIVE FURNACE FOR MANUFACTURE OF ACETYLENE BY PYROLYSIS

Rudolph Leonard Hasche and William B. Hincke, Kingsport, Tenn., assignors to Eastman Kodak Company, Rochester, N. Y., a corporation of New Jersey Application September 18, 1941, Serial No. 411,418

6 Claims. (Cl. 23—277)

This invention relates to processes and apparatus for obtaining rapid heat input and withdrawal at high temperatures without apparatus destruction, and particularly to process and apparatus for manufacturing acetylene by the pyrolysis of hydrocarbons. More particularly this invention concerns a pyrolysis or cracking treatment carried out in a specially constructed regenerative, heat and make, or similar type of apparatus operated by novel procedure wherein high yields of acetylene, and other advantages, may be obtained.

This application is a continuation-in-part of our application Ser. No. 259,198, filed March 1, 1939.

In the industries, acetylene has been produced from calcium carbide but this is a rather expensive procedure. It has been proposed to produce acetylene by other methods, such as by the pyrolysis of hydrocarbons. Acetylene, however, is somewhat unstable, tends to polymerize, or become overcracked, or otherwise presents problems in production. While acetylene may be successfully produced in externally heated tubes, there are certain conditions under which it is desirable to provide a different apparatus and method for manufacturing acetylene from hydrocarbons, as for example, non-availability of large tubes, special installation problems, installation of large units and other conditions.

The regenerative type furnace is quite old and has been used for many years in the manufacture of illuminating gas, carbon black, hydrogen, and more recently in the manufacture of aromatic hydrocarbons. Although the regenerative type furnace has been employed for the aforementioned purposes, its use for the pyrolysis of hydrocarbons to acetylene has been limited and the results not particularly satisfactory. After considerable investigation, we have found various respects wherein prior art type of regenerative apparatus was not satisfactory for acetylene manufacture and otherwise discovered disadvantages possessed by prior art equipment.

We have found that by certain marked departures, as will be described in detail hereinafter, in the construction of the regenerative type equipment, suitable apparatus for acetylene manufacture, and other purposes, may be obtained. While in some respects our novel apparatus may appear at first glance to be similar to prior art constructions, actually our new apparatus and process may be considered as involving rather substantial departures from conventional practice.

We have found an efficient method and apparatus for the manufacture of acetylene from hydrocarbons wherein the pyrolysis treatment is obtained from heat stored in refractory surfaces, providing certain procedure is followed and the apparatus constructions employed described in detail hereinafter.

This invention has for one object to provide a regenerative type of heating apparatus which will withstand high rates of heat input and withdrawal at high temperatures and is particularly adapted for processing hydrocarbons to obtain acetylene therefrom. Still another object is to provide a regenerative type furnace which includes features of construction involving a substantial departure from conventional regenerative furnaces. Another object is to provide a regenerative furnace wherein hydrocarbon materials may be raised to 1200–1600° in a relatively short period of time, of the order of a fraction of a second. Still another object is to provide a regenerative furnace construction wherein there are certain definite ratios between the heating surfaces and the heating spaces, as will be described in detail hereinafter.

Still another object is to provide a pyrolysis process particularly adapted for manufacturing acetylene from non-acetylenic hydrocarbons, wherein the pyrolysis heating is obtained from the heat stored in refractory masses. Still another object is to provide a pyrolysis process for converting saturated hydrocarbons to unsaturated hydrocarbons such as acetylene with a minimum of carbon monoxide and carbon dioxide formation, even though regenerative heating is employed in the pyrolysis. A still further object is to provide a novel method for operating a regenerative cracking furnace employed in manufacturing acetylene containing gas from hydrocarbon materials. Other objects will appear hereinafter.

In our investigation, we have developed certain information which is discussed below, inasmuch as it is believed such discussions will aid in a better understanding of our novel process and apparatus.

In the high temperature pyrolysis of hydrocarbon materials for the production of acetylene, a large number of competing reactions take place. The simplest reaction and apparently the predominating one at temperatures of 1000° C. is substantially complete decomposition of the hydrocarbon to the elements hydrogen and carbon. If water vapor or steam, or catalytic materials such as for example nickel, are present, water gas reaction products as carbon monoxide, carbon dioxide, water, and hydrogen may result.

Inasmuch as in the prior art the first reaction was desired, namely, the decomposition of the hydrocarbon into carbon black and hydrogen, for example, regenerative furnaces were filled with refractory checker-brick more or less miscellaneously cross-piled or positioned within the apparatus. Since the object in the prior art regenerative furnace was merely to delay the passage of the hydrocarbons until they had obtained temperatures in excess of 1000° C. and become decomposed to carbon and hydrogen, various simplified baffling arrangements functioned satisfactorily. In such prior art constructions refractory several inches in thickness was frequently employed with a flue space the same size as the refractory. Therefore, the ratio in such construction is 1:1. This matter of ratio will be discussed in greater detail hereinafter.

In the employment of regenerative furnaces for preparing aromatic materials from hydrocarbons, while certain changes in construction were made, such furnaces were not suitable for use in the production of acetylene for various reasons. For example, the length and ratios possessed by the checker-work were improper.

In order to secure relatively high yields of acetylene in a regenerative furnace, we found that a number of factors should be taken into consideration and controlled as follows:

First, the maximum temperature to which the hydrocarbon and/or other materials are to be heated;

Second, the time required for the hydrocarbon to obtain this temperature;

Third, the residence time that the gas is at this temperature and the rapidity with which it is cooled; and Fourth, the materials from which the regenerative heating elements are constructed.

After considerable investigation, we have found that by the use of the construction described in detail hereinafter, a regenerative furnace and process highly satisfactory for use in manufacturing acetylene from hydrocarbon materials was obtained. In our regenerative furnace it is readily possible to operate within the following standards: (1) the maximum temperature to which the hydrocarbon and diluent mixture heated is between approximately 1200° C. and 1600° C., (2) the time interval required for the hydrocarbon-diluent to attain such a temperature is less than 0.20 second in the range from 700° C. to the maximum, (3) the time interval that the acetylene containing gas can be maintained at the high temperatures before quenching to below 400° C. is less than approximately 0.20 second, (4) the materials from which the heat storing and heat transferring elements are constructed have the following properties—(a) as nearly non-catalytic as possible to the undesirable decomposition reactions such as the formation of carbon black, etc., (b) refractory at the high temperatures described, (c) having high enough heat conductivity to be able to transfer heat from its interstices to the surface of the heating element for balancing the rather rapid removal of heat by the hydrocarbon material, as necessitated by conditions 1 and 2, and (d) a high heat capacity.

For a more complete understanding of our invention, reference is made to the attached drawings forming a part of the present application.

Figs. 3 and 4 are cross sectional views indicating the various types of sectional construction and appearance thereof that our apparatus may have.

Fig. 5 is a detail view of a cross section through the cracking chamber, showing in particular the relationship between the thickness of the slots or passageways and the thickness of the refractory bounding the same.

Figure 1:
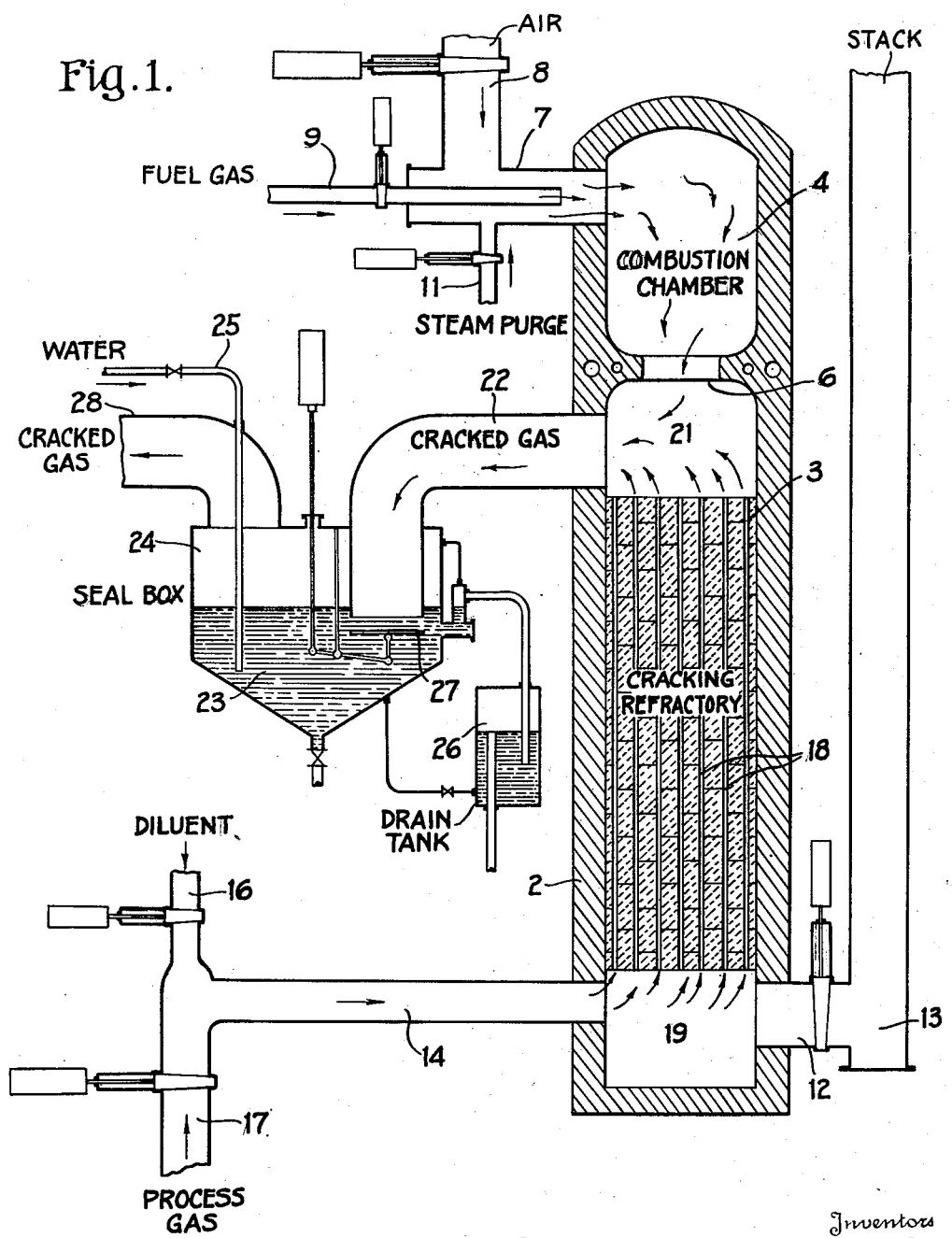
Fig. 1 is a semi-diagrammatic side elevation view of one form of apparatus which might be employed for carrying out our invention.

Referring to Fig. 1, 2 represents the unit in which heating and processing operations may be carried out. The entire unit may be constructed of steel, ceramic work and insulating materials. The interior of this unit is comprised of the cracking or pyrolysis assembly 3 and combustion chamber 4. The combustion chamber communicates with part 3 by means of the throat 6. By this construction and by our novel operation, as will be described in detail hereinafter, we are able to prevent overcracking because of the hydrocarbon gases being processed coming into contact with refractory surfaces heated to extremely high temperatures, as of necessity in the vicinity of the burners.

The combustion chamber is equipped with one or more units 7, for supplying heat thereto. These units may more or less comprise a structure the same or similar to conventional liquid or gaseous fuel burners. For example, a source of combustion air is provided at 8 and a source of fuel at 9. These conduits may be, if desired, connected with preheaters but such is not necessary in our construction. In addition, the construction is provided with a conduit 11 for introducing steam or other purging medium into the apparatus. All of the aforementioned parts would be equipped, preferably, with automatic-synchronized valves. However, manually operated equipment may be employed.

The lower portion of the unit is connected by valved conduit 12 to a stack 13. The lower portion is also connected by conduit 14 to sources of diluent 16 and gas 17 for processing to acetylene.

Intermediate of the unit are provided a plurality of gas passageways 18 of a particular construction. These passageways should be constructed so that there are definite relationships between the surface of the passageway to the volume thereof, as well as other relationships. That is, for example, the ratio of the surface of any one of these passageways expressed in square feet to the volume of the passageway expressed in cubic feet should be greater than 30. The ratio of the cross section area of any one of said passageways to the area of refractory surface should be less than 0.01. As indicated above, our construction is considerably different from the construction employed in gas making or carbon black regenerative furnaces. For example, where in ordinary regenerative practice the ratio of slot thickness to refractory thickness, taken on horizontal section, is approximately 1:1, we have found that a 1:3 to 1:6 ratio (as will be discussed in detail under Figs. 3, 4 and 5) is required in acetylene production. The passageways are constructed from refractory brick, as for example silicon carbide bricks laid up in long narrow passageways of any desired width. For example, the passageways might be 15–30 feet long, several feet wide, and a fraction of an inch thick. As indicated, silicon carbide bricks or slabs are preferred. Our preferred checkerwork is built of split bricks, which is a brick not greater than 1½ inches in thickness, laid on edge with slots ¼" to ⅜" thick. The other dimensions of the split bricks are not critical and may comprise the usual ones of 4½ x 9 inches. If other refractory material is employed it should possess a heat conductivity comparable to and preferably at least 75% that of silicon carbide, in the temperature range from 1000° C. to 1600° C. These passageways conduct the materials from the inlet chamber 19 to the chamber or header 21 from which the reaction products may be withdrawn through conduit 22 to a quenching device 23. For best results, the header should be as restricted in volume as possible, thereby differing from usual regenerative furnaces in this respect. For example, we prefer to construct the header in our apparatus of such a restricted volume that the velocity of the cracked gas mixture passing through the header is at least 5,000 ft. per minute. In acetylene production the use of such a restricted header is desirable to shorten the time the gases remain at high temperature before being quenched.

This quenching device comprises the liquid seal box 24 partly filled with a quenching medium such as water, introduced through pipe 25. Suitable overflow mechanism and valve may be provided at 26 and 27. The offtake conduit 28 for the acetylene-containing gases produced may be connected with various equipment as described in Hasche Patents 2,236,534 and 2,236,535, or in the several Wulff Patents 1,843,965, 1,880,308, and 1,880,309.

Figure 2:
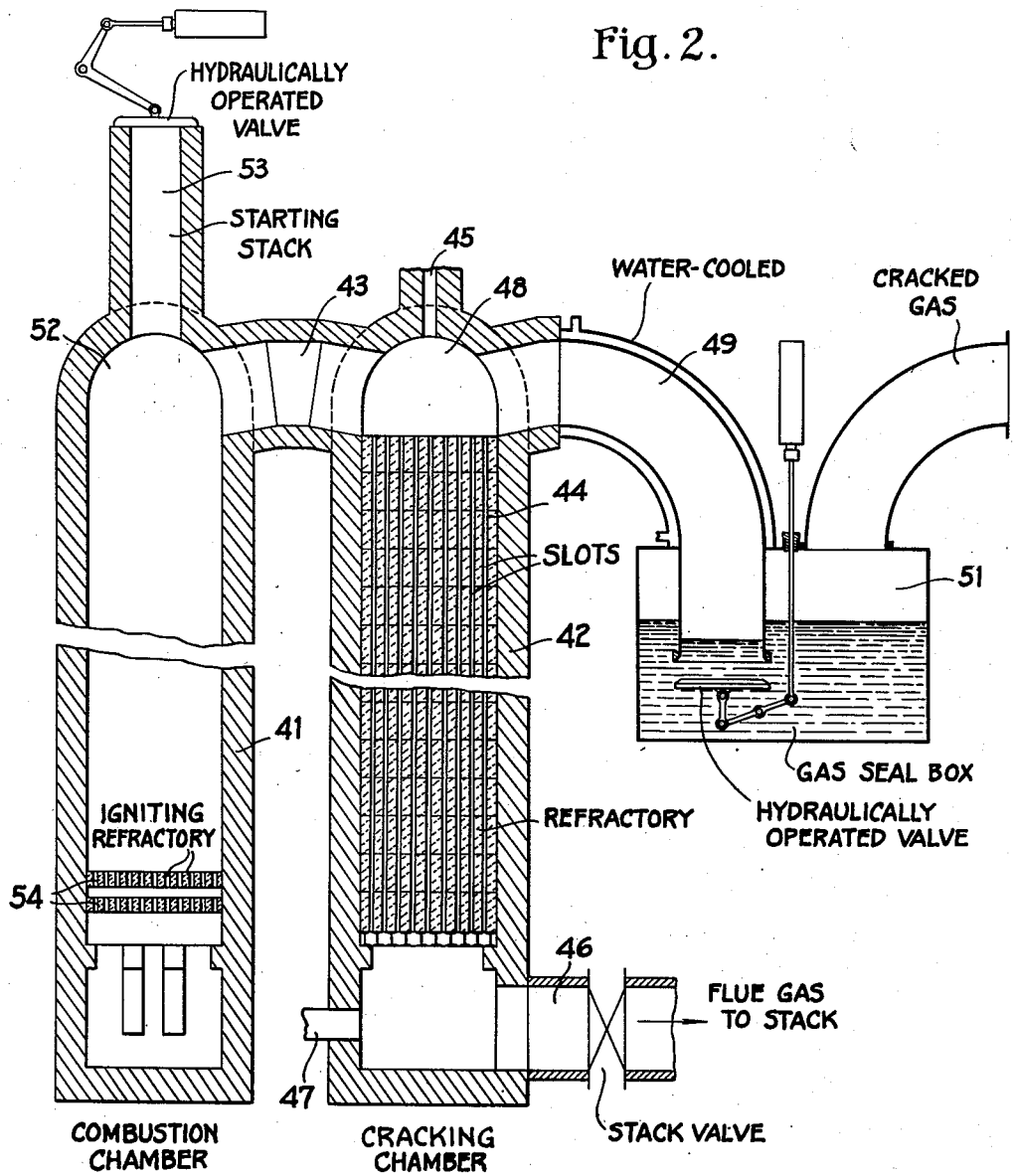
Fig. 2 is also a semi-diagrammatic side elevation view exemplifying wherein the apparatus may be modified.

The construction shown in Fig. 2 is in many respects similar to that already described with respect to Fig. 1. In the arrangement of Fig. 2, the combustion chamber 41 is independent of the processing unit 42. However, the combustion chamber is positioned adjacent and connected to the processing chamber by means of the passageway 43, comparable to some extent to the throat 6 (Fig. 1). Processing chamber 42 is provided with the elongated slot construction 44, the same as described with respect to Fig. 1. That is, the ratios of slot thickness to refractory thickness, area ratios and other construction, is exactly comparable to that described. For satisfactory operating conditions, it is highly desirable that the construction of these slots, in which the hydrocarbon gases become pyrolyzed, be fabricated with considerable care and in accordance with the novel arrangement we have disclosed, and as well be considered in further detail hereinafter.

The lower portion of unit 42 is provided with conduit 46 leading to the stack and inlet 47 for the materials to be processed. The outlet chamber 48 is connected by conduit 49 to quenching device 51, similar to that already described with respect to Fig. 1. Part 45 comprises an opening for inspection of the top of the checker which also serves as a means for obtaining temperature and for gas sampling.

As already indicated, passageway 43 connects the pyrolysis chamber to the combustion chamber 52. A starting stack is provided at 53 and the remainder of the construction may be in accordance with whether oil, gas or other type of fuel is to be burned for furnishing heat to chamber 42. Igniting checkers 54 and other similar elements may be included. It is, of course, understood that suitable inlets (not shown) for fuel and air would lead to the combustion chamber.

It is also understood that our apparatus may be equipped with flow meters, pyrometers or various other measuring or recording devices for assisting in the operation thereof.

Referring now in particular to Figs. 3, 4, and 5, additional explanation will be set forth respecting the ratio of the slot area to the area of refractory on any cross section through the cracking chamber. An understanding of our novel ratios is apparent to a substantial extent from the construction of the legends appearing on the drawings where the various dimensions of thickness of refractory, thickness of slot (or passageway) and widths thereof have been indicated.

While we have indicated in Figs. 3 and 4 that the external configuration of our apparatus may be circular or rectangular, in general the exact external configuration is not a limitation upon our invention. That is, the shape of our apparatus may be regular or irregular as may be desired. We usually employ a regular construction inasmuch as this lends itself to easier construction with standard split bricks and other standard materials. In the event of an irregular construction where there are slots of varying widths it also generally follows that the width of the refractory will vary in a comparable manner; hence, for computations we have found that it is satisfactory to usually consider the average width of the slots and refractory the same. Hence, with this in mind, although we may refer to the ratio existing between the slot or passageway area and the refractory area, their ratio may resolve itself to one between the thickness of the slot and the thickness of the refractory. Also, the range of the ratio, namely 1:3 to 1:6, provides latitude for irregular configurations. The ratio as respects numerical dimension, therefore, is between the ¼- to ½-inch thickness of the slot as designated on Fig. 5 as "passageways" or as 18 in Fig. 1, or as 44 in Fig. 2, and the maximum 1½-inch thickness of the refractory. Since the width, as indicated, may be considered the same for both slots and refractory, the ratio of the slot area to the refractory area on any cross section would likewise fall within the range of 1:3 to 1:6. In other words, the refractory is three times as thick as the slot and may be six times as thick as the slot. An example of the latter instance is where a 1½-inch thick refractory is employed with a ¼-inch slot. The lower limit of the thickness of the refractory is, of course, governed by the aforesaid ratios, but the limit on this lower dimension is not as important a factor as the specification that the thickness of the refractory not exceed approximately 1½ inches.

That a maximum of 1½ inches, as specified, should be employed has been discovered by us after extensive investigation as being a factor substantially contributing to the longevity and resistance of our apparatus to thermal deterioration. In the operation of our processes involving extremely high rates of heat withdrawal and heat input at the high temperatures between, for example 1000° C. and 1600° C., special regard for the dimensions of the refractory is required. In other words, if the refractory of 2-inch thickness or higher, as recommended in the prior art in certain constructions, were attempted for use under the rate of heat withdrawal and other conditions encountered in acetylene manufacture, spalling or other thermal deterioration of the refractory takes place. While constructions involving refractory several inches thick may be satisfactory for low temperature processes, we have found that such constructions are unsuitable for the high temperatures and high rates with which the process and apparatus of the present invention are concerned.

In our construction, however, we have found that the thickness of the refractory being within the ratio of 1:3 to 1:6 aforesaid, that is, three to six times as thick as the slot or passageway bounded thereby, is ample to heat the materials in the passageway within the time period allotted, yet withstanding spalling better than thicker refractory.

In our preferred construction we would, however, keep the thickness of the slots to about ¼ inch to ⅜ inch, said slots being bounded by split "carborundum" bricks of about 1¼ inches in thickness. The preferred ratio would be 1:3 to 1:4. However, as indicated, provided there is a refractory thickness not greater than approximately 1½ inches, satisfactory results may be obtained.

The operation of our apparatus, as well as a better understanding of our novel process for producing acetylene, may be had from the consideration of the following examples, which are set forth primarily for illustrating the preferred embodiments of our invention. Assuming the process is to be carried out in apparatus such as shown in Fig. 1, the valves in the lines 16 and 17 would be closed as well as the valve in the line 22. The stack valve would be open and combustion started in chamber 4 by introducing the ignited fuel and air therein. The combustion would be carried out so as to obtain a flame temperature above 1500° C.–1600° C. The hot combustion gases pass through the throat 6 into contact with the elongated slots, thereby heating the refractory bricks defining said slots. By our construction, it is possible to transfer 80–85% of the combustion heat to the refractory, the exit gases escaping to the stack. At the expiration of two or three minutes, depending upon the size of the equipment, rate of combustion and other factors, the heating is discontinued and steam introduced through conduit 11. In a short time, as a few seconds, this steam sweeps all of the combustion products out of the chamber and into the stack. Thereafter the stack valve is closed.

Immediately thereafter hydrocarbons to be processed and diluents, such as steam, are admitted through lines 16 and 17 and pass into chamber 19. From thence the mixture to be processed passes up through the elongated slots which have been previously described and become heated to a temperature, in this example, of approximately 1250–1350° C. and pass into chamber 21.

The steam purge previously referred to has during this time been continued and flows through throat 6 becoming intimately mixed with the acetylene containing gases at 21. While not essential, this use of steam may be desirable because it prevents the gas being processed from entering the combustion chamber or otherwise contacting such parts and thereby becoming overcracked. At the same time the steam increases the velocity of the cracked mixture in its passage through conduit 22 and into the quencher 23. The valve 27 having been previously opened, permits the cracked gas to become quenched by flowing through the liquid in the quencher, thereby dropping the temperature to below 400° C. Thereafter, the acetylene containing gases are withdrawn through conduit 26 to a gas holder or other equipment.

In the operation of our process, the hydrocarbon-containing material, such as butane and steam diluent, is passed through the elongated slots 18 at a rate of flow greater than 10 pounds of hydrocarbon per minute per square foot of cross sectional area of slots, but less than approximately 100 pounds per minute. As previously indicated, the slots are not greater than ½ inch in width. The length of the slots may be 15 feet or they may be longer, as for example 30 feet. Usually the ½-inch thickness of slot would be employed when the slots are 25 or 30 feet long. By such procedure and by the use of the elongated slot construction described, the hydrocarbon completes its passage through the slots in a fraction of a second, yet in this small period of time is capable of taking up from the refractory sufficient heat to raise its temperature and crack it to an acetylene-containing gas. The gas being processed preferably contains a diluent such as steam and in addition, as already indicated, when the processed gas emerges into chamber 21, it may become further mixed with steam flowing through the conduit 6. This steam purge, if employed, during the cycle helps conduct the off gas to the quenching device and to prevent unnecessary eddies into the combustion chamber.

The gas removed through conduit 26 may contain 14–16% acetylene. After the process has been in operation a minute or so, the temperature of the silicon carbide bricks will have dropped somewhat and the quantity of acetylene being produced may also drop. At this point, the processing cycle may be stopped by closing first the valve in line 17 and shortly thereafter the valve in the diluent line 16. Valve 27 would be closed and the stack valve open. The steam through conduit 11 is discontinued and air introduced through conduit 8. This air burns out any carbon accumulating in the elongated slots. A short time thereafter, fuel is introduced through conduit 9 and the heating cycle starts and is operated for a few minutes until the refractory has again obtained the desired temperature.

By automatic operation and synchronization of the valves, the heating and processing cycle operated as described, thereby obtaining a continuous type process. By employing cycles of a few minutes each, the quantity of acetylene produced is generally above 10%, particularly when saturated hydrocarbons as propane, butane, pentane, and the like are the hydrocarbons processed. However, the various hydrocarbons and diluents listed in the aforementioned Wulff patents, Hasche Patents 2,236,534 and 2,236,535, and other prior art, may be treated; hence, extended comment herein is unnecessary.

Referring to Fig. 2, the operation and construction of this modified unit is similar in many respects to that already described. In this unit the heating in chamber 41 would be operated alternately with the processing in chamber 42. The heating chamber 41 would be started up and oil, gas or other fuel capable of producing a high temperature introduced therein to obtain temperatures, for example, in excess of 1600° C. The hot combustion products are conducted through the throat 43, the passageways 44 and out the stack conduit 46. During this cycle the valve at the end of conduit 49 would, of course, be closed.

At the conclusion of the heating step the hydrocarbon and diluent to be processed would be introduced through 47 or other suitable point for passage through the slots. As already pointed out with respect to Fig. 2, the passageway construction 44 is such that the hydrocarbons passing therethrough absorb sufficient heat within a fraction of a second to crack the hydrocarbons to acetylene-containing gas which are conducted through 49 to the quencher. As described with respect to Fig. 1, the heating cycle and pyrolyzing cycle are operated alternatively, the cracking cycle consuming, for example, one or two minutes, the changing of the valves a few seconds and the heating cycle three to five minutes. As already indicated, preferably prior to the starting of the heating cycle, after the completion of the cracking cycle some air would be introduced for a few seconds, thereby burning out any carbon from the elongated slots. Thereafter, the fuel supply would be started and hot combustion products produced in the combustion chamber. The completely burned products flowing through the elongated slots passageways, quickly and readily heat the refractory work to the high temperature specified. As a matter of fact, the gases going to the stack are at a relatively moderate temperature, the greater portion of the heat having been removed therefrom in the refractory work.

As pointed out, in our construction the slot refractory ratio is considerably different from that in regenerative units used for hydrogen and/or carbon black production, the heat is readily given up at a high rate to the materials being processed and by this high rate of heat transfer the hydrocarbon becomes decomposed to a gas containing acetylene, ethylene and other constituents. For example, from our process a gas containing 12%–16% acetylene and 5%–25% ethylene may be readily obtained.

When cracking butane with an 8:1 volume ratio of steam to hydrocarbon and employing a cracking cycle of 1½ minutes duration, following are analyses of cracked gas obtained in percent by volume:

|  | After 15 secs. | After 90 secs. | Average entire cycle |
|---|---|---|---|
| $CO_2$ | 1.6 | 0.8 | 1.1 |
| $C_2H_2$ | 14.1 | 11.2 | 12.3 |
| $C_2H_4$ | 12.5 | 23.0 | 17.6 |
| $C_3H_6$ | 0.5 | 0.6 | 0.6 |
| $O_2$ | 0.2 | 0.2 | 0.3 |
| $H_2$ | 39.4 | 33.2 | 38.0 |
| $CO$ | 3.3 | 1.2 | 1.7 |
| $CH_4$ | 22.2 | 27.4 | 26.4 |
| $C_2H_6$ | 0.0 | 1.0 | 0.6 |
| $N_2$ | 1.5 | 1.4 | 1.4 |

The steam purge and other elements already described with respect to Fig. 1, may likewise be employed when operating the process in Fig. 2. For example, if desired, steam may be introduced near throat 43, or a valve may be inserted in this passageway. However, by the particular construction shown in Fig. 2, chance of overcracking, due to contact with combustion chamber parts, is minimized, and such features may be omitted.

The following specific data will illustrate in further detail the high rate of heat transfer obtainable in our novel process and apparatus for acetylene manufacture. In the furnace from which the following data was taken, the portion of the elongated slots at a temperature above 700° C. was approximately 7½ feet. The slots constituted relatively straight narrow, unobstructed passageways as apparent from the drawings. The other dimensions of the heating passageways fell within the ratios already described in detail, hence, further description thereof is unnecessary. The refractory bounding the slots in this example were constructed of the refractory commercially known as "Carborundum." The cracking cycle was of approximately 1½ minutes duration, the heating cycle being roughly twice the cracking. The following were the operating conditions:

Average refractory temperature, bottom of reaction zone, 700° C.
Average refractory temperature, top of reaction zone, 1400° C.
Average gas temperature, bottom of reaction zone, 900° C.
Average gas temperature, leaving cracking zone, 1275° C.
Log mean temperature difference, 159° C.
Butane cracked, 45.5 C. F.
Steam dilution, 300 C. F.
Sensible and reaction heat of butane and steam, 37,200 B. t. u.
Surface of Carborundum exposed in reaction zone, 39.4 sq. ft.
Effective thickness of Carborundum checkers from surface to center, 0.315 in. (this represents an average amounting to approximately one-quarter of a split brick)

From these data, the heat transfer in B. t. u.'s/inch/square foot/degree Fahrenheit/hour can be calculated as follows:

$$\frac{37,200 \times 60}{39.4 \times 0.315 \times 1.5 \times 159 \times 1.8} = 41.8 \text{ B. t. u.}$$

The figure of 41.8 B. t. u. is, of course, an average figure for the entire cracking zone. It would be lower at the bottom of the zone and at the top considerably higher. We have found that the limiting factor that regulated the heat transfer in our novel process and regenerative apparatus for converting hydrocarbons to acetylene is not the resistance of hydrocarbon gas film, but is to a large extent the conductivity of the refractory itself (in this instance Carborundum). Although radiation plays an important role, the heat must be transferred to the surface before it can be radiated.

As indicated, the heating cycle lasts about twice as long as the cracking cycle. Likewise, the heating conductivity of the refractory is an important factor. During our heating cycle there was burned 17.9 C. F. of butane which theoretically liberates 58,000 B. t. u. From this may be subtracted the heat in the combustion products at a temperature of approximately 900° C., the temperature of the gas leaving the hot zone (approximately 19,000 B. t. u.) This gives 39,000 B. t. u., which satisfactorily corresponds to the heat transferred in the cracking cycle, (37,200 B. t. u.) when allowing for heat losses. In the aforementioned cracking cycle, the heating elements should not be heated too hot. That is, the temperature difference between the turbulent hydrocarbon gas film and through which the gas is being heated, should not be over about 150° C. or 200° C. Otherwise, if the heating elements become too hot, a heterogeneous overcracking reaction may take place in the film which produces a preponderance of decomposition products in the final gas. In our apparatus the gas passes through the heating channels in a highly forced convection state of turbulence.

It is, therefore, apparent that our process and apparatus is susceptible of some modification. However, it is to be observed that for preferred operation the ratios respecting surface of heating refractory, the mass of heating refractory, and quantity of hydrocarbons fed are somewhat critical and should be followed in accordance with our disclosure herein.

Space velocity for the purpose of this application is defined as the pounds of hydrocarbon plus steam fed per minute per cubic foot of slot or void volume. We have found that the space velocity should be somewhat carefully controlled for optimum acetylene production and that it should be between about 5–30 pounds of hydrocarbon plus steam per minute per cubic foot of slot volume. Employing the other elements of our invention around 12–18 pounds is preferred.

When measuring a refractory surface the dimensions, the circumference or perimeter, of the passageway by its length (i. e. height in figures shown) would be employed. Otherwise, when computing volume, the dimensions, height, width and thickness of the passageway would be employed.

When computing the areas on a cross section, the width times the thickness of the slot or the refractory, as the case might be, would be employed. In most instances, since the width may be considered as unity since it is the same as for both the slot and refractory, the ratios may be observed directly from a comparison of the respective thicknesses.

We prefer to employ a refractory such as silicon carbide, bricks as a standard commercially obtainable brick, such as "Carborundum." However, other refractory materials that possess a heat conductivity comparable to and not less than about 75% that of "Carborundum" might be substituted in all or in part in the construction of the vertical elongated slots that comprise our apparatus. While we have described butane as the hydrocarbon cracked, any of the various other hydrocarbons, both aliphatic and aromatic, gaseous or liquid, as described in the aforesaid Hasche patents, or the several Wulff patents referred to herein, may be processed in accordance with the invention described herein. Likewise, any of the various diluents may be employed.

It can be seen from the foregoing that our apparatus is particularly advantageous since it will withstand a high rate of heat withdrawal, sufficient to crack hydrocarbons to acetylene, and high temperatures. It is apparent that since our apparatus will operate under the critical conditions of producing acetylene and withstand thermal conditions encountered, that our apparatus will readily withstand the less drastic conditions encountered in other types of processes where less exacting conditions are required such as the heating of gases in connection with steel annealing or the heating of organic materials to produce ethylene, or the heating of other organic materials.

What we claim and desire to be secured by Letters Patent of the United States is:

1. An apparatus for use in carrying out high temperature pyrolysis processes above 1200° C. which comprises a housing, a plurality of silicon carbide refractory members not greater than one and one-half inches thick positioned within the housing to form a plurality of elongated slot passageways ¼ to ⅜ inch thick, approximately 7½ to 30 feet long and several feet wide, the ratio of the area, on a cross-section through the apparatus, of slot to area of refractory being between 1:3 to 1:4, the ratio of the surface of any one of the passageways expressed in square feet to the volume of the passageway expressed in cubic feet being greater than 30, and conduits for feeding the materials to be pyrolyzed and for withdrawing the products formed, associated with the apparatus.

2. An apparatus for use in heating gaseous materials to temperatures in excess of 1100° C. which comprises a housing, a plurality of silicon carbide members of a dimension not greater than one and one-half inches thickness positioned within the housing to form a plurality of elongated passageways several feet long and wide, but only ¼ to ⅜ inch thick, the ratio of the slot area to the refractory area on a cross-section through the cracking chamber being from 1:3 to 1:4, the ratio of the surface of any one of the passageways expressed in square feet to the volume of the passageway expressed in cubic feet being greater than 30, and means for supplying said material to and withdrawing heated materials from the apparatus, associated therewith.

3. An apparatus for converting hydrocarbons to acetylene comprising a unit including a combustion chamber and a processing chamber, means connecting said chambers, said processing chamber containing a plurality of silicon carbide refractory members not greater than one and one-half inches thick, positioned therein to form a plurality of elongated slot passageways at least 7½ feet long but only ¼ to ½-inch thick, the ratio of slot to refractory on a cross section through the processing chamber being between 1:3 to 1:6, the ratio of the area of the silicon carbide surface of any one of said passageways to the volume thereof expressed in cubic feet being greater than 30, and conduits for feeding said hydrocarbons to and withdrawing the acetylene formed in the processing chamber, associated with the apparatus.

4. An apparatus for heating gases to high temperatures in excess of 1100° C. with high rate of heat withdrawal, comprising a housing, said housing containing a plurality of silicon carbide brick members of a thickness not greater than one and one-half inches, said members thickness thereby being such that destructive spalling does not occur at said high temperatures and rate of heat withdrawal, said silicon carbide members being positioned to form a plurality of unobstructed slot passageways more than approximately 7½ feet long, and ¼ to ½ inch thick, the ratio of the area of passageway on a cross section to area of refractory being from 1:3 to 1:6, the ratio of the silicon carbide surface of any one of said passageways expressed in square feet to the volume thereof expressed in cubic feet being greater than 30, conduit means leading to the apparatus for supplying said gases thereto, and other conduit means for withdrawing heated gases therefrom, associated with the apparatus.

5. In an apparatus of the class described, a housing, a plurality of silicon carbide refractory members not greater than one and one-half inches thick positioned within the housing to form a plurality of elongated, substantially unobstructed passageways ¼- to ½-inch thick, approximately 7½ to 30 feet long and several feet wide, the construction being characterized in that on at least substantially the major part of any cross section of a section across the aforesaid refractory and slots, the refractory thickness with respect to the passageway thickness will be not less than three times and not greater than six times said passageway thickness, and means for supplying materials to said passageways and withdrawing heated materials therefrom, associated with said apparatus.

6. In an apparatus of the class described, a housing, a plurality of silicon carbide refractory members not greater than one and one-half inches thick positioned within the housing to form a plurality of elongated, substantially unobstructed passageways ¼- to ½-inch thick, approximately 7½ to 30 feet long and several feet wide, the construction being characterized in that on at least substantially the major part of any cross section of a section across the aforesaid refractory and slots, the refractory thickness with respect to the passageway thickness will be not less than three times and not greater than six times said passageway thickness, the ratio of the surface of any one of the passageways expressed in square feet to the volume of the passageway expressed in cubic feet being greater than 30, and means for supplying materials to said passageways and withdrawing heated materials therefrom, associated with said apparatus.

RUDOLPH LEONARD HASCHE.
WILLIAM B. HINCKE.